(12) United States Patent
Soliman

(10) Patent No.: US 8,861,502 B2
(45) Date of Patent: *Oct. 14, 2014

(54) ASSISTED INITIAL NETWORK ACQUISITION AND SYSTEM DETERMINATION

(75) Inventor: Samir S. Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1683 days.

This patent is subject to a terminal disclaimer.

(21) Appl. No.: 12/041,639

(22) Filed: Mar. 3, 2008

(65) Prior Publication Data

US 2009/0221283 A1    Sep. 3, 2009

(51) Int. Cl.
*H04J 3/06* (2006.01)
*H04W 48/14* (2009.01)

(52) U.S. Cl.
CPC ................................. *H04W 48/14* (2013.01)
USPC ........... 370/350; 370/331; 370/328; 370/338; 455/437; 455/436; 455/11.1; 455/550.1

(58) Field of Classification Search
USPC ......................................................... 455/41.2
See application file for complete search history.

(56) References Cited

U.S. PATENT DOCUMENTS

| | | | |
|---|---|---|---|
| 6,208,870 B1 | 3/2001 | Lorello et al. | |
| 6,512,930 B2 | 1/2003 | Sandegren | |
| 7,299,009 B2 * | 11/2007 | Hussmann | 455/41.2 |
| 7,324,815 B2 | 1/2008 | Ross et al. | |
| 7,508,799 B2 | 3/2009 | Sumner et al. | |
| 7,613,426 B2 | 11/2009 | Kuehnel et al. | |
| 7,768,977 B2 | 8/2010 | Camp, Jr. | |
| 2001/0034224 A1 | 10/2001 | McDowell et al. | |
| 2003/0142641 A1 * | 7/2003 | Sumner et al. | 370/328 |
| 2004/0205158 A1 * | 10/2004 | Hsu | 709/218 |

(Continued)

FOREIGN PATENT DOCUMENTS

| | | |
|---|---|---|
| CN | 1636329 A | 7/2005 |
| DE | 102006029664 | 1/2008 |

(Continued)

OTHER PUBLICATIONS

International Search Report and the Written Opinion—PCT/US2009/034596, International Search Authority—European Patent Office—Jun. 3, 2009.

(Continued)

*Primary Examiner* — Charles Appiah
*Assistant Examiner* — Randy Peaches
(74) *Attorney, Agent, or Firm* — Michael J. DeHaemer, Jr.

(57) ABSTRACT

A method and system is provided for initial network acquisition by a first device that is assisted by a second device. Rather than scanning one or more frequency bands to discover local wireless network information, the first device may send a request for local wireless network information over a secondary communication interface (i.e., a communication interface not associated with the wireless network for which information is sought). A second device that may have previously obtained the requested network information (e.g., it may have joined or be communicating through the wireless network) may respond by sending the requested wireless network information to the first device. Upon receiving the wireless network information via its secondary communication interface, the first device may use it to acquire a communication service from the wireless network over a primary communication interface (i.e., different from the secondary communication interface).

62 Claims, 5 Drawing Sheets

(56) References Cited

U.S. PATENT DOCUMENTS

| | | | |
|---|---|---|---|
| 2005/0058102 A1 | 3/2005 | Santhoff et al. | |
| 2005/0090200 A1* | 4/2005 | Karaoguz et al. | 455/41.2 |
| 2005/0094593 A1* | 5/2005 | Buckley | 370/328 |
| 2005/0099972 A1 | 5/2005 | Motegi et al. | |
| 2005/0271018 A1 | 12/2005 | Liu et al. | |
| 2005/0282494 A1 | 12/2005 | Kossi et al. | |
| 2006/0013160 A1 | 1/2006 | Haartsen | |
| 2006/0045134 A1 | 3/2006 | Eldon et al. | |
| 2006/0187858 A1* | 8/2006 | Kenichi et al. | 370/254 |
| 2007/0183374 A1* | 8/2007 | Classon et al. | 370/338 |
| 2008/0003946 A1 | 1/2008 | Lee et al. | |
| 2008/0062933 A1* | 3/2008 | Liu et al. | 370/332 |
| 2008/0070504 A1 | 3/2008 | Benkert et al. | |
| 2009/0022103 A1* | 1/2009 | Shatsky | 370/331 |
| 2010/0035629 A1 | 2/2010 | Soliman | |

FOREIGN PATENT DOCUMENTS

| | | |
|---|---|---|
| JP | 2005142967 A | 6/2005 |
| JP | 2005260486 A | 9/2005 |
| JP | 2008011040 A | 1/2008 |
| KR | 20080098649 A | 11/2008 |
| RU | 2005102401 A | 7/2005 |
| WO | WO03039009 A2 | 5/2003 |
| WO | WO2004077752 | 9/2004 |
| WO | WO-2007092670 A2 | 8/2007 |
| WO | WO-2008020216 A1 | 2/2008 |
| WO | WO2008024099 | 2/2008 |
| WO | WO2009022801 | 2/2009 |

OTHER PUBLICATIONS

Taiwan Search Report—TW098106723—TIPO—Apr. 5, 2012.

Bluetooth Specification Version 2.1 +EDR (vol. 1), published Jul. 26, 2007, by the Promoter Members of Bluetooth SIG, Inc.

Lsaksson L., et al., "Validation of Simulations of Bluetooth's Frequency Hopping Spread Spectrum Technique," Proceedings of Advanced Simulation Technologies Conference, Arlington, Virginia, 2004, pp. 156-165.

Standard ECMA-368 "High Rate Ultra Wideband PHY and MAC Standard," Dec. 1, 2005, 1st Edition, pp. 1-312.

Welsh E., et al., "Improving connection time for Bluetooth devices in Mobile environments," Proceedings of the International Conference on Fundamentals of Electronics, Communications and Computer Sciences, 2002.

* cited by examiner

ASSISTED INITIAL NETWORK ACQUISITION AND SYSTEM DETERMINATION

BACKGROUND

1. Field

At least one feature relates to acquisition of communication systems, and, more particularly, to a method for assisting a communication device to improve wireless network acquisition time by obtaining information from other communication devices already in the network.

2. Background

In wireless communication networks, an access terminal or mobile device/station typically scans a defined frequency spectrum to identify one or more access nodes (e.g., cells, base stations, Node Bs, Access Node, etc.) through which it may obtain wireless communication service. This is often referred to as system acquisition and typically happens when the mobile station (MS) is powered On after being off for some time or when the mobile station recovers from lack of coverage or switches between two different networks (e.g., 2G and 3G networks). In these cases, the mobile station searches through a list of carrier frequency candidates. For each frequency, the mobile station may attempt to detect a preamble or acquire a scrambling code and phase of the strongest access node detected or found. The length of the frequency list depends on the actual scenario, e.g. if the mobile station has been moved outside it home coverage area (e.g., service region, state city, country, etc.) while it was powered off, then the frequency list can be quite long. Most often, the correct carrier frequency is not known and the frequency scanning process involves a coarse frequency scan (e.g., where a frequency band may be identified) followed by fine frequency scan (e.g., where particular channels within the frequency band may be scanned). Cell acquisition (e.g., access node acquisition) may then be done on each channel where energy is found during the fine frequency scan. During the cell acquisition, the mobile station searches for service both in frequency and code space which is typically an undesirably large number of hypotheses or combinations to search. Once an appropriate access node is selected, the mobile station is ready to communicate signaling messages to establish a data and/or voice session via the selected access node.

Due to the scanning performed by the mobile station to identify access nodes and acquire a scrambling code and phase, the acquisition process may take a noticeably long time. Consequently, a way is needed to expedite and/or improve the acquisition process service may be acquired more quickly by a mobile station.

SUMMARY

A method for assisted initial network acquisition is provided. Rather than scanning one or more frequency bands to discover local wireless network information, a first device may send a request for local wireless network information to a nearby second device. Such request for network information may be a specific request for information about a particular type of wireless network (e.g., GSM, CDMA, etc.), a specific request for one or more networks associated with a particular service provider, and/or a general request for all networks that may be locally available in that region.

The second device, which may have previously obtained the requested network information (e.g., it may have joined or be communicating through the wireless network), may respond by sending the requested wireless network information to the first device. Upon receiving the wireless network information from the second device, the first device may use it to acquire a communication service from the wireless network. The first device may obtain the network information from the second device via a secondary communication interface but communicates with the network over a different primary communication interface.

A method operational on an access terminal is provided for initial network acquisition. A request for wireless network information is sent over a secondary communication interface. The request for wireless network information may also be broadcasted to other local communication devices. In response, the wireless network information may be received over the secondary communication interface. A communication service may be acquired or established from a wireless network over a primary communication interface using the wireless network information.

In some implementations, the access terminal may search for a last known wireless network over the primary communication interface before sending the request for wireless network information. The access terminal may also scan one or more frequency bands over the primary communication interface to obtain the wireless network information if such wireless network information is not received over the secondary communication interface.

The primary communication interface and the secondary communication interface may be adapted to communicate with different types of networks. In one example, the primary communication interface may be adapted to communicate within a first frequency band and the secondary communication interface may be adapted to communicate within a second frequency band, wherein the first and second frequency bands are non-overlapping. The primary communication interface may be adapted for communications over a wide area wireless network via an access node. For instance, the primary communication interface is adapted for communications over a Public Land Mobile Network. The secondary communication interface is adapted for communications over at least one of an ad-hoc communication link and a peer-to-peer communication link. In one example, the secondary communication interface is a Bluetooth-compliant communication interface.

In one instance, the access terminal is starting or resuming operations in an unknown wireless network region. In another instance, the access terminal is switching operation from a first network type to a second network type.

In one example, the method may operate on a multi-mode access terminal capable of communicating over different types of wireless networks (e.g., CDMA, GSM, etc.). The access terminal may ascertain a network type associated with the received wireless network information and select a mode of operation for the primary communication interface consistent with the network type.

An access terminal may comprise a primary and secondary communication interface and a processing circuit. The primary communication interface may be adapted for communications over a wide area wireless network. The secondary communication interface may be adapted for communications over an ad-hoc communication link. The processing circuit may be coupled to the primary communication interface and the secondary communication interface and configured to: (a) send a request for wireless network information over the secondary communication interface; (b) receive the wireless network information over the secondary communication interface; and/or (c) acquire a communication service from a wireless network over the primary communication interface using the wireless network information. The processing circuit may further configured to (a) search for last known wireless network over the primary communication interface before sending the request for wireless network information, and/or (b) scan a frequency band over the primary communication interface to obtain the wireless network information if such wireless network information is not received over the secondary communication interface.

The primary communication interface and the secondary communication interface may be adapted to communicate with different types of networks. For instance, the primary communication interface is adapted to communicate within a first frequency band and the secondary communication interface is adapted to communicate within a second frequency band, wherein the first and second frequency band are non-overlapping. In other instances, the primary communication interface may be adapted for communications over a wide area wireless network or a Public Land Mobile Network. Similarly, the secondary communication interface may be adapted for communications over at least one of an ad-hoc communication link and a peer-to-peer communication link, such as a Bluetooth-compliant communication interface. In one example, the primary communication interface may be adapted for long-range communications relative to the secondary communication interface which is adapted for short-range communications.

In some instances, the access terminal may be starting or resuming operations in an unknown wireless network region. In other instances, the access terminal is switching operation from a first network type to a second network type.

Consequently, an access terminal is provided comprising: (a) means for sending a request for wireless network information over a secondary communication interface; (b) means for receiving the wireless network information over the secondary communication interface; (c) means for acquiring a communication service from a wireless network over a primary communication interface using the wireless network information; (d) means for searching for last known wireless network over the primary communication interface before sending the request for wireless network information; and/or (e) means for scanning one or more frequency band over the primary communication interface to obtain the wireless network information if such wireless network information is not received over the secondary communication interface. The primary communication interface and the secondary communication interface may be adapted to communicate with different types of networks.

A circuit for wireless network communications is also provided wherein the circuit is adapted to (a) send a request for wireless network information over a secondary communication interface; (b) receive the wireless network information over the secondary communication interface; (c) acquire a communication service from a wireless network over a primary communication interface using the wireless network information; and/or (d) scan one or more frequency bands over the primary communication interface to obtain the wireless network information if such wireless network information is not received over the secondary communication interface. The primary communication interface and the secondary communication interface may be adapted to communicate with different types of networks.

A computer-readable medium is also provided comprising instructions for initial network acquisition, which when executed by a processor causes the processor to: (a) send a request for wireless network information over a secondary communication interface; (b) receive the wireless network information over the secondary communication interface; (c) acquire a communication service from a wireless network over a primary communication interface using the wireless network information; and/or scan one or more frequency bands over the primary communication interface to obtain the wireless network information if such wireless network information is not received over the secondary communication interface.

A method operational on an access terminal is also provided for assisting another device in initial network acquisition. Wireless network information may be maintained or stored for a wireless network associated with a primary communication interface. A wireless network information request may be received over a secondary communication interface from a requesting communication device. The wireless network information is then sent to the requesting communication device via the secondary communication interface. A frequency band associated with the wireless network may be monitored via the primary communication interface to obtain the wireless network information. In some implementations, the request for wireless network information may be ignored if it comes from a device associated with a different network carrier than the wireless network. The primary communication interface and the secondary communication interface may be adapted to communicate with different types of networks. For instance, the primary communication interface may be adapted for communications over a wide area wireless network, such as a Public Land Mobile Network.

The secondary communication interface may be adapted for communications over at least one of an ad-hoc communication link and a peer-to-peer communication link, such as a Bluetooth-compliant communication interface.

An access terminal is also provided comprising a primary and secondary communication interfaces and a processing circuit. The primary communication interface may be adapted for communications over a wide area wireless network. The secondary communication interface may be adapted for communications over an ad-hoc communication link. The processing circuit is coupled to the primary communication interface and the secondary communication interface and configured to (a) maintain a wireless network information for a wireless network associated with the primary communication interface; (b) receive a wireless network information request over the secondary communication interface from a requesting communication device; (c) send the wireless network information to the requesting communication device via the secondary communication interface; (d) monitor a frequency band associated with the wireless network via the primary communication interface to obtain the wireless network information; and/or (e) ignore the request for wireless network information if it comes from a device associated with a different network carrier than the wireless network. The primary communication interface and the secondary communication interface may be adapted to communicate with different types of networks. For instance, the primary communication interface may be adapted for communications over a wide area wireless network, such as, a Public Land Mobile Network. The secondary communication interface may be adapted for communications over at least one of an ad-hoc communication link and a peer-to-peer communication link. For example, the secondary communication interface is a Bluetooth-compliant communication interface.

Consequently, an access terminal is provided comprising: (a) means for maintaining a wireless network information for a wireless network associated with a primary communication interface; (b) means for receiving a wireless network information request over a secondary communication interface from a requesting communication device; (c) means for sending wireless network information to the requesting communication device via the secondary communication interface; and/or (d) means for monitoring a frequency band associated with the wireless network via the primary communication interface to obtain the wireless network information. The primary communication interface may be adapted to communicate within a first frequency band and the secondary communication interface may be adapted to communicate within a second frequency band, wherein the first and second frequency band may be non-overlapping.

A circuit for wireless network communications is also provided where the circuit is adapted to (a) maintain a wireless network information for a wireless network associated with a primary communication interface; (b) receive a wireless network information request over a secondary communication interface from a requesting communication device; (c) send wireless network information to the requesting communication device via the secondary communication interface; and/or (d) monitor a frequency band associated with the wireless network via the primary communication interface to obtain the wireless network information.

A computer-readable medium is also provided comprising instructions for initial network acquisition, which when executed by a processor causes the processor to (a) maintain a wireless network information for a wireless network associated with a primary communication interface; (b) receive a wireless network information request over a secondary communication interface from a requesting communication device; (c) send wireless network information to the requesting communication device via the secondary communication interface; and/or (d) monitor a frequency band associated with the wireless network via the primary communication interface to obtain the wireless network information.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
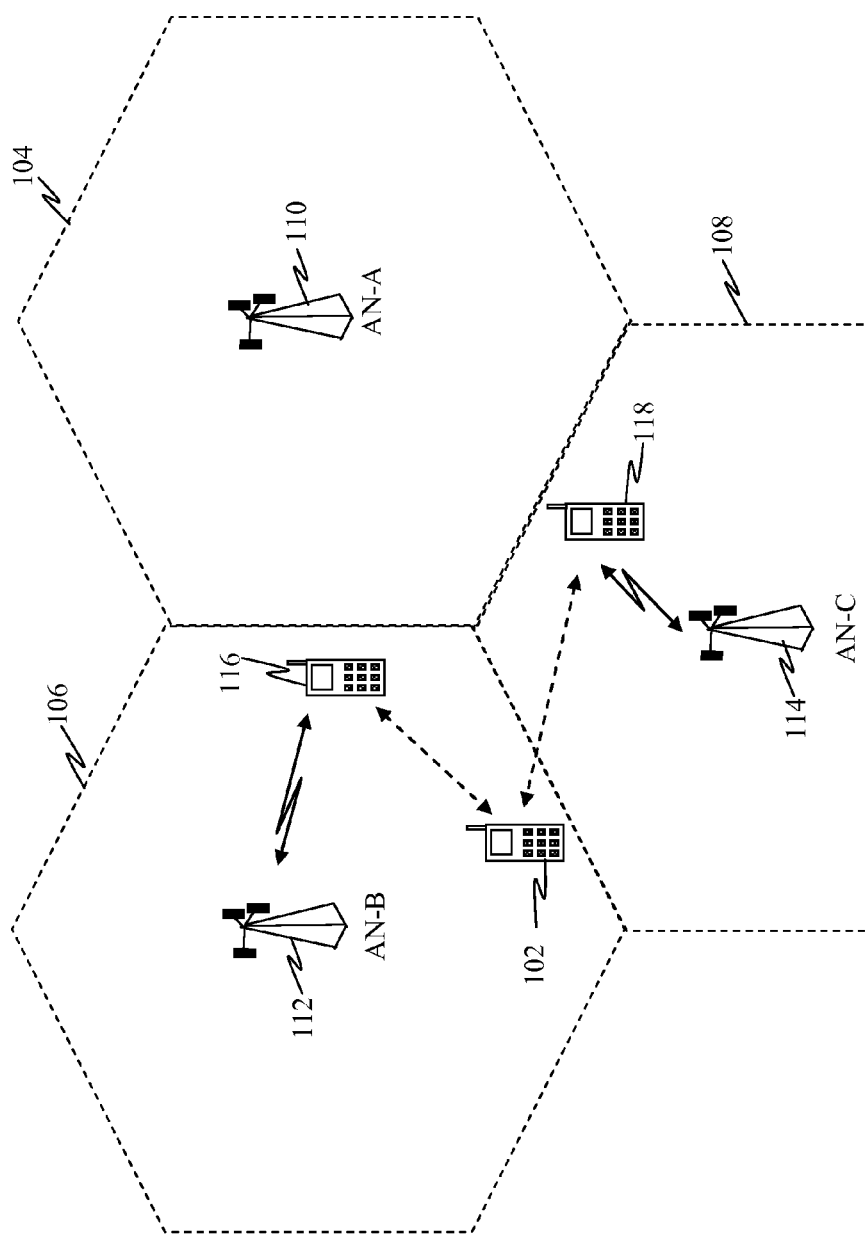
FIG. 1 illustrates a wireless communication system in which an access terminal may perform assisted cell acquisition.

In the following description, specific details are given to provide a thorough understanding of the configurations. However, it will be understood by one of ordinary skill in the art that the configurations may be practiced without these specific detail. For example, circuits may be shown in block diagrams in order not to obscure the configurations in unnecessary detail. In other instances, well-known circuits, structures and techniques may be shown in detail in order not to obscure the configurations.

Also, it is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In one or more examples and/or configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above are also be included within the scope of computer-readable media.

Moreover, a storage medium may represent one or more devices for storing data, including read-only memory (ROM), random access memory (RAM), magnetic disk storage mediums, optical storage mediums, flash memory devices and/or other machine readable mediums for storing information.

Furthermore, configurations may be implemented by hardware, software, firmware, middleware, microcode, or any combination thereof. When implemented in software, firmware, middleware or microcode, the program code or code segments to perform the necessary tasks may be stored in a computer-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the following description, certain terminology is used to describe certain features. The terms "access terminal" and "communication device" may be interchangeably used to refer to a mobile device, mobile phone, wireless terminal, and/or other types of mobile or fixed communication apparatus capable of communicating over a wireless network.

To reduce the initial network acquisition time for an access terminal within a wireless network, the access terminal may take advantage of other nearby devices. The nearby terminals, mobile or fixed, may have already acquired information for the wireless network (e.g., Public Land Mobile Network (PLMN) information, frequencies, channels, timing, scrambling codes and/or phases for nearby access nodes, etc.) in a coverage area and can provide it to the access terminal. In this manner, the access terminal can avoid a long scanning or acquisition process and more quickly acquire an access node/cell of the network. The wireless network information (e.g., PLMN information, operating frequencies, channels, timing, scrambling codes and/or phases for nearby access nodes, etc.) may be shared through a short range wireless link such as Bluetooth. An assumption may be that acquisition of the short radio link is much faster than the initial acquisition of the wide area system.

Another feature provides power conservation for an acquiring access terminal implementing assisted network acquisition. By obtaining the network information from another nearby access terminal, the acquiring access terminal may consume less power than if it had performed an exhaustive scan of one or more frequency bands to discover such information itself. Since a secondary communication interface used to acquire the network information from the nearby access terminal may be a short-range or low-power interface, it may consume less power than a primary communication interface used for longer range communications via the wireless network of interest. Therefore, power consumption may be conserved and the operational life of the acquiring access terminal may be extended.

FIG. 1 illustrates a wireless communication system in which an access terminal may perform assisted cell acquisition. The access terminal 102 may find itself in a network region without prior knowledge of network information. The network region may include one or more cells 104, 106, and/or 108, each cell having one or more access nodes 110, 112, and/or 114. The access terminal 102 may be powering On after being Off for some time or it may be recovering from a lack of coverage or it may be switching between two different networks (e.g., 2G and 3G networks or UMTS and LTE).

One goal of the access terminal 102 during an initial network/cell acquisition is to select a useable cell/sector for network communications. Initial network acquisition is typically carried out: at switch On or power On, after recovery from lack of coverage, reception of a background PLMN search request, awaking from a period of deep sleep, and/or switching between different networks (e.g., from 2G to 3G service).

Conventionally, network acquisition is often done by sequentially scanning all channels within one or more frequency bands. When the access terminal 102 is first turned On, it may read the PLMN and International Mobile Subscriber Identity (IMSI) information stored in a subscriber identity Module (SIM) card. IMSI is assigned by the service provider to an access terminal (subscriber) as a permanent ID associated with its subscription. Upon startup, the access terminal typically reads its stored PLMN information from its SIM and begins initial network acquisition. Such network acquisition often involves a frequency scan followed by an acquisition scan. Although frequency and acquisition scans algorithms are implementation dependent, the access terminal may first attempt network acquisition using its PLMN information stored in its SIM (e.g., typically its home PLMN or last known PLMN information). If no suitable cell or access node is found using this PLMN information, the access terminal may extend its scan by implementing a frequency scanning algorithm in which frequency bands for its Radio Resource Control are exhaustively searched to try to identify all PLMN within radio contact. A frequency scanning algorithm may involve a coarse frequency scan followed by a fine frequency scan. During the coarse frequency scan, a wide frequency band is coarsely scanned by detecting carrier power at regular intervals to identify potential access node (cell) narrow frequency bands. In the fine frequency scan, the identified potential access node frequency bands are scanned at finer intervals to identify particular channels. The frequency scanning algorithm may also adjust its power detection threshold in an attempt to identify pilots from access nodes or cells. An acquisition scan is then performed where the access terminal searches the identified channels in frequency and code space to acquire a scrambling code and phase for access node (cell) which it can use for communications over the wireless network. The average acquisition time is function of the number of the frequency bands searched, number of frequency assignments in each band, channel conditions, and pilot signal strength from local access nodes (cells). Because such scanning may involve several hundred searches, this results in a noticeable delay and power consumption for an access terminal.

Rather than scanning frequency bands, the access terminal 102 may communicate with other local access terminals 116 and 118 to obtain such information. For example, the access terminals 102, 116 and 118 may include a communication interface (e.g., Bluetooth, etc.) that allows them to communicate with each other independent of the wireless network (e.g., the access nodes 112, 114, 116). In this example, the access terminal 102 may be able to identify and communicate with other access terminals 116 and 118 in less time than it would take it to scan one or more frequency bands to obtain network information (e.g., identify access nodes, frequencies, channels, timing, scrambling codes and/or phases, etc.).

Many modern mobile phones include multiple wireless interfaces. A mobile phone with no prior knowledge of network information may utilize a secondary communication interface to obtain such network information from other nearby mobile phones with knowledge of about the network to speed up the initial cell acquisition process. For instance, frequency, time and/or code information could be transferred to the mobile phone trying to initially acquire the network.

Figure 2:
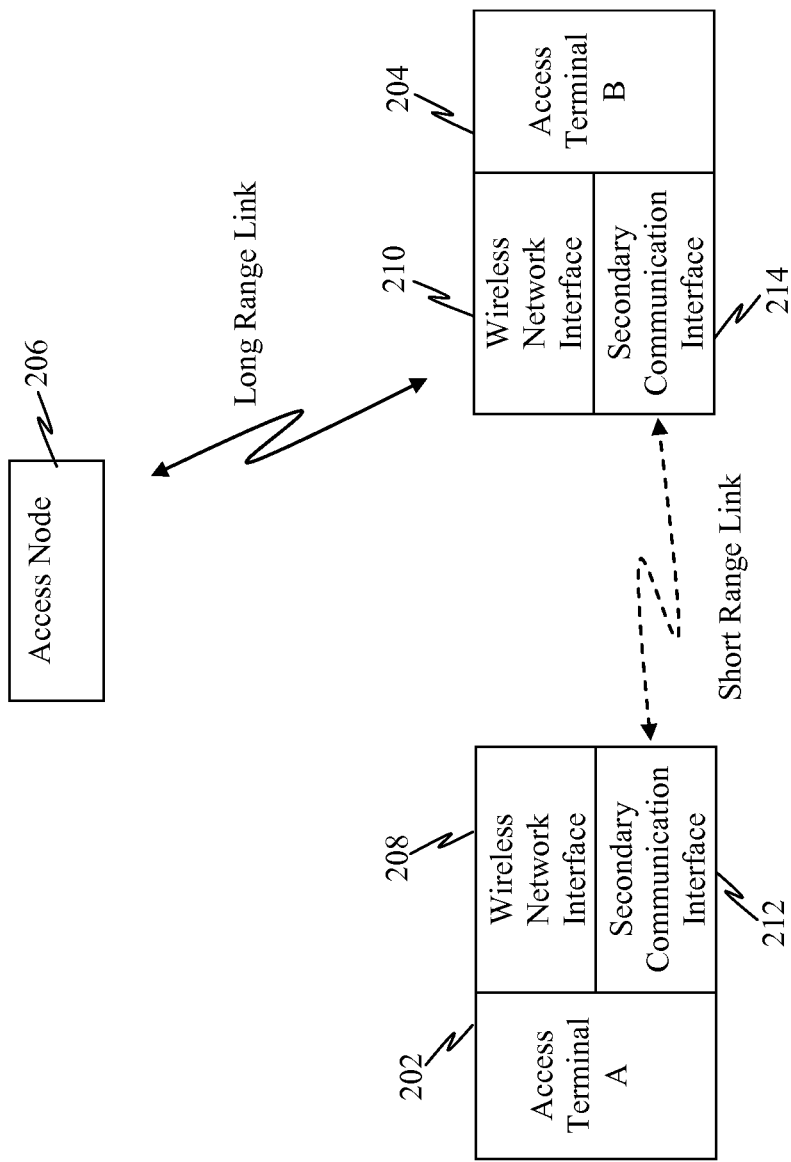
FIG. 2 is a block diagram illustrating how an access terminal may obtain network information from another access terminal already part of the network.

FIG. 2 is a block diagram illustrating how an access terminal may obtain network information from another access terminal already part of the network. A first access terminal A 102 may have no prior knowledge of a wireless network it intends to join. However, a second access terminal B 204 may already have joined the wireless network (e.g., may be communicating with an access node 206) and/or obtained wireless network information (e.g., identified access nodes, communication frequencies, channels, timing, scrambling codes and/or phases, etc).

The access terminals A 202 and B 204 may include wireless primary communication interfaces 208 and 210 and secondary communication interfaces 212 and 214 (e.g., Bluetooth-compliant). The wireless primary communication interfaces 208 and 210 may be a long range communication interface or a wide area network interface, such as a Universal Mobile Telecommunications System (UMTS) compliant interface, WiMax, or Long Term Evolution (LTE), that serves to communicate with the wireless network. The wireless network may be a managed network where a network controller facilitates communications to/from access terminals via one or more access nodes. The secondary communication interfaces 212 and 214 may be a short range communication interface, such as a Bluetooth interface, that may facilitate, for example, peer-to-peer communications. The secondary communication interfaces 212 and 214 may not be associated with the wireless network.

Upon starting up and not finding its expected home network via the wireless network interface 208, the first access terminal A 202 may scan for other access terminals via the secondary communication interface 212. Alternatively, the first access terminal A 212 and second access terminal 214 may have a pre-established association or there may be a pre-established association between their secondary communication interfaces 212 and 214. In this example, the second device B 204 may have already acquired network information for the wireless network used by wireless communication interface 208 and 210. The first access terminal 202 may find the second communication device 204 within range of its secondary communication interface 212. The first access terminal 212 may then obtain network information from the second access terminal B 204 via a short range link between the secondary communication interfaces 212 and 214. Such network information may include, for example, a list of PLMN active in the area or region, a list of the offset frequencies relative to the short range link reference frequency (e.g., the offset frequencies identifying frequencies associated with one or more access nodes, base stations, etc.), and other time and/or code information (e.g., associated with one or more access nodes, base stations, etc.) that may be used to speed up the cell acquisition process. Using such network information, the first communication device 202 may acquire service via the access node 206, for example.

In some implementations, the access terminal A 202 may be a multi-mode device capable of communicating over different types of networks (e.g., CDMA, GSM, etc.). That is, the wireless network interface may be capable of communicating over different types of networks. Alternatively, the access terminal A 202 may include additional network interfaces for the different types of networks. Consequently, the network information obtained from the second access terminal B 204 via a short range link may be specific for a particular type of wireless network (e.g., GSM, CDMA, etc.), specific to one or more networks associated with a particular service provider, and/or general to all networks that may be locally available in that region and known to the second access terminal B 204.

Another feature of obtaining the network information from the second access terminal B 204 is that the first access terminal A 202 may consume less power than if it had performed an exhaustive scan of one or more frequency bands to discover such information itself. Since the secondary communication interface 212 may be a short-range or low-power interface, it may consume less power than the wireless communication interface 208 (which is used for longer range communications). Therefore, power consumption may be conserved and the operational life of the first communication device A 202 is extended. This may be particularly useful where the first access terminal A 202 is powered by batteries, for example, since it means that the device can operate for longer periods of time between recharging.

Figure 3:
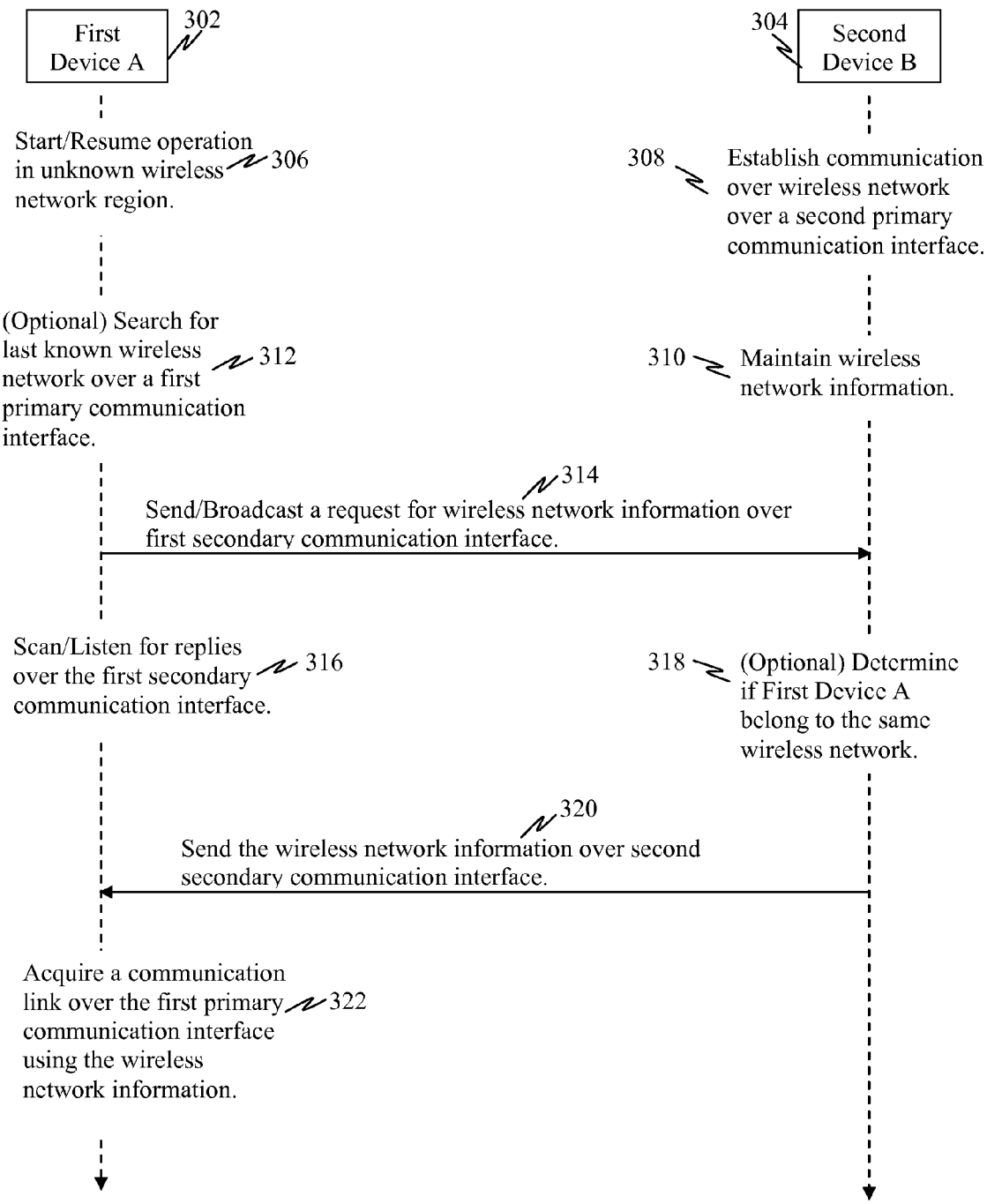
FIG. 3 illustrates a method between two devices to facilitate distribution of wireless network information from a first device to a second device.

FIG. 3 illustrates a method between two devices to facilitate distribution of wireless network information from a first device (i.e., first access terminal) to a second device (i.e., second access terminal). The first device A 302 may startup or resume operations in an unknown wireless network region 306. Both the first device A 302 and second device B 304 may have a first and second primary communication interfaces (e.g., long-range interface, high-power interface, PLMN interface, etc.) for communicating with a wireless network (e.g., managed wireless network, wide area network, PLMN network, etc.) and a first and second secondary communication interface (e.g., short-range interface, low-power interface, Bluetooth-compliant interface, etc.) for peer-to-peer and/or ad-hoc communications.

The second device B 304 may have previously established communications over the wireless network over the second primary communication 308. Consequently, the second device B 304 may maintain wireless network information (e.g., identify access nodes, frequencies, channels, timing, scrambling codes and/or phases, etc., for the wireless network). The first device A 302 may optionally search for its last known wireless network over a first primary communication interface 308. If this is unsuccessful, the first device A 302 may send or broadcast a request for wireless network information over its first secondary communication interface 314. The first device A 302 may scan or listen for replies over the first secondary communication interface 316. Note that the request 314 may be a specific request for a particular type of wireless network (e.g., GSM, CDMA, etc.), a specific request for one or more networks associated with a particular service provider, and/or a general request for all networks that may be locally available in that region and known to the second device B 304.

The second device B 304 may optionally determine if the first device A 302 belongs to the same wireless network 318. If so, it may send the wireless network information over the second secondary communication interface 320. The first device A 302 may then acquire a communication link (e.g., acquire a cell, access node, base station, etc.) over the first primary communication interface using the wireless network information 322. Because the wireless network information is obtained from the nearby second device B, the first device A 302 is able to avoid a longer scan for this information and quickly acquires communications with an access node for the wireless network.

Figure 4:
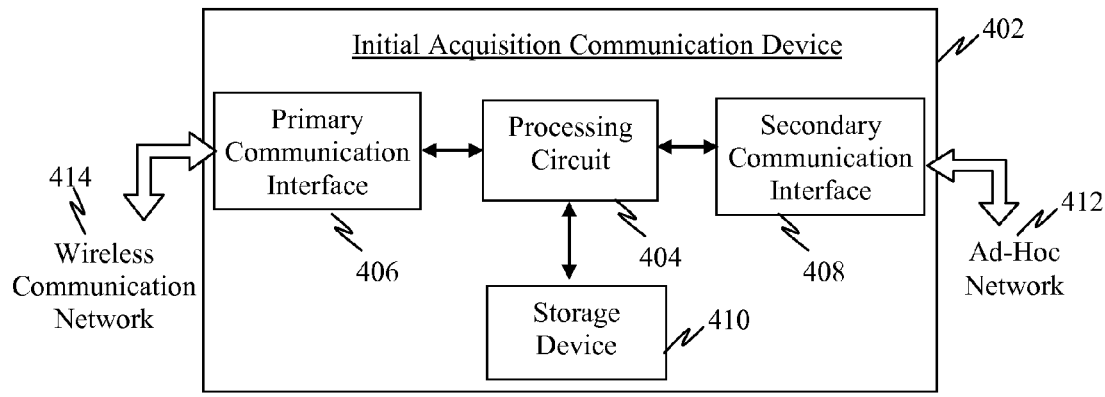
FIG. 4 is a block diagram illustrating an example of a communication device that may be configured for assisted initial network acquisition.

FIG. 4 is a block diagram illustrating an example of a communication device that may be configured for assisted initial network acquisition. The communication device 402 (e.g., access terminal) may include a processing circuit 404 coupled to a primary communication interface 406, a secondary communication interface 408, and a storage device 410. The primary communication interface 406 may serve to communicate over a wireless communication network 414 (e.g., wide area network, PLMN, etc.) while the secondary communication interface 408 may serve to communicate over an ad-hoc (or peer-to-peer) network 412 (e.g., Bluetooth-compliant network). The primary communication interface 406 may be a high-power or long-range communication interface 406 relative to the lower power and shorter range secondary communication interface 408. The communication device 402 may use the storage device 410 to store information for the wireless communication network 414.

The primary communication interface 406 and the secondary communication interface 408 may be adapted to communicate with different types of networks. For instance, the primary communication interface 406 may be adapted to communicate within a first frequency band and the secondary communication interface 408 may be adapted to communicate within a second frequency band, wherein the first and second frequency band are non-overlapping. The primary communication interface 406 may adapted for communications over a wide area wireless network or over a Public Land Mobile Network. The secondary communication interface 408 may be adapted for communications over at least one of an ad-hoc communication link and a peer-to-peer communication link. For instance, the secondary communication interface 408 is a Bluetooth-compliant communication interface.

Upon an initial startup or resumption after no network service, the communication device 402 may be within a region for an unknown wireless communication network 414. In another scenario, the communication device 402 may be switching operations from a first network type to a second network type, where the communication device 402 has insufficient knowledge of the second network type to acquire communications.

Rather than scanning one or more frequency bands to obtain wireless network information with which to setup a communication link over the primary communication interface, the communication device 402 may utilize its secondary communication interface 408 to obtain such network information from another nearby communication device that is already part of the wireless communication network 414.

According to various examples, the communication link via the secondary communication interface 408 (with another nearby device) may be established in a number of ways. For instance, the communication device 402 may send request for network information in a broadcast via the secondary communication interface 408 on a channel monitored by other devices (e.g., without having established a previous relationship with those other devices). Alternatively, the communication device 402 may identify one or more nearby or local devices and send each device a targeted request for network information via the secondary communication interface 408 with or without a prior relationship being established with those other nearby or local devices. For instance, where the secondary communication interface 408 is a Bluetooth-compliant interface, an "acquisition" profile may be established that is recognized by other Bluetooth-compliant devices as a request for local wireless network information (e.g., PLMN, wide area network, etc.).

In one implementation, the communication device 402 may be a multi-mode device capable of communicating over different types of networks (e.g., CDMA, GSM, etc.). That is, the primary communication interface may be capable of communicating over different types of networks. In one example, the communication device 402 may include additional network interfaces for the different types of networks. Consequently, the request for wireless network information may be for a particular type of wireless network (e.g., GSM, CDMA, etc.), specific to one or more networks associated with a particular service provider, and/or all networks that may be locally available in that region. Depending on the network information received over the secondary communication interface 408, the communication device 402 may use a network interface compatible with the received network information.

Figure 5:
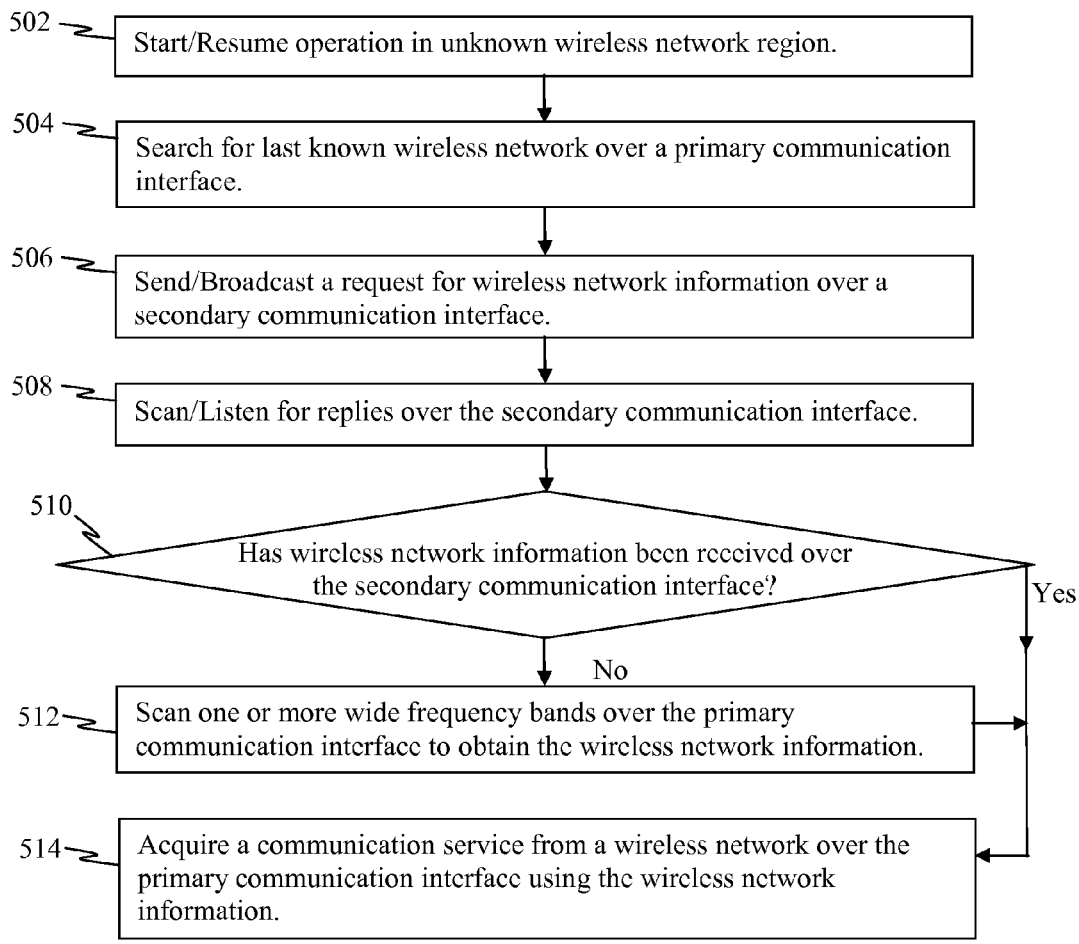
FIG. 5 illustrates a method operational on a communication device to perform assisted initial network acquisition according to one example.

FIG. 5 illustrates a method operational on the communication device 402 to perform assisted initial network acquisition according to one example. The communication device may start/resume operation in an unknown wireless network region 502. Alternatively, communication device may be switching operation from a first network type to a second network type (e.g., 2G to 3G network or UMTS to LTE). Optionally, the communication device may search for its last known wireless network over a primary communication interface 504. It may send or broadcast a request for wireless network information over secondary communication interface 506. For instance, the request for wireless network information may be broadcasted to other local communication devices. Any other nearby communication device capable of receiving such request may respond to the communication device, via a peer-to-peer/ad-hoc communication link, with the wireless network information.

The communication device may scan or listen for replies over the secondary communication interface 508 (e.g., from other nearby devices). If the communication device receives the wireless network information over the secondary communication interface 510, it may then acquire a communication service (e.g., acquire a connection/link with an access node) over the primary communication interface using the wireless network information 514. If no wireless network information is received over the secondary communication interface 510, then the communication device may scan or listen for wireless network information over the primary communication interface 512.

The primary communication interface and the secondary communication interface may be adapted to communicate with different types of networks. For instance, the primary communication interface may be adapted to communicate within a first frequency band and the secondary communication interface may be adapted to communicate within a second frequency band, where the first and second frequency band are non-overlapping. The primary communication interface is adapted for communications over a wide area wireless network via an access node and/or over a Public Land Mobile Network. The secondary communication interface may be adapted for communications over at least one of an ad-hoc communication link and a peer-to-peer communication link. For instance, the secondary communication interface may be a Bluetooth-compliant communication interface.

As a result of implementing assisted network acquisition, the communication device 402 may consume less power than if it had performed an exhaustive scan of one or more frequency bands to discover such network information itself. Since the secondary communication interface may be a short-range or low-power interface, it may consume less power than the primary communication interface (which is used for longer range communications). Therefore, power consumption may be conserved and the operational life of the communication device 402 may be extended.

According to yet another configuration, a circuit in a communication device or access terminal may be adapted to send a request for wireless network information over a secondary communication interface (e.g., a Bluetooth-compliant interface, a peer-to-peer interface, a short-range interface, a low-power interface, etc.). The same circuit, a different circuit, or a second section of the same or different circuit may be adapted to receive the wireless network information over the secondary communication interface. In addition, the same circuit, a different circuit, or a third section of the same or different circuit may be adapted to acquire a communication service from a wireless network over a primary communication interface (e.g., wide area network interface, PLMN interface, high-power interface, long-range interface, etc.) using the wireless network information. Similarly, the same circuit, a different circuit, or a fourth section may be adapted to scan one or more frequency bands over the primary communication interface to obtain the wireless network information if such wireless network information is not received over the secondary communication interface. One of ordinary skill in the art will recognize that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

Figure 6:
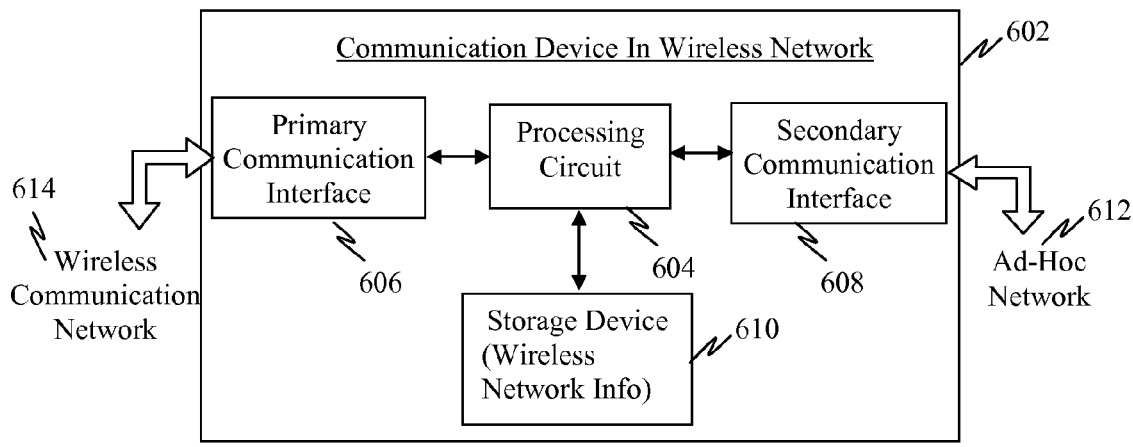
FIG. 6 is a block diagram illustrating an example of a communication device that may be configured to assist in the initial network acquisition by another communication device.

FIG. 6 is a block diagram illustrating an example of a communication device that may be configured to assist in the initial network acquisition by another communication device. The communication device 602 may include a processing circuit 604 coupled to a primary communication interface 606, a secondary communication interface 608, and a storage device 610. The primary communication interface 606 may serve to communicate over a wireless communication network 614 (e.g., wide area network, PLMN, etc.) while the secondary communication interface 608 may serve to communicate over an ad-hoc (or peer-to-peer) network 612 (e.g., Bluetooth-compliant network). The primary communication interface 606 may be a high-power or long-range communication interface 606 relative to the lower power and shorter range secondary communication interface 608. The communication device 602 may use the storage device 610 to store information for the wireless communication network 614.

The communication device 602 is assumed to be operational on the wireless communication network and/or to have obtained information about the wireless communication network. Such wireless network information may include, for example, a list of PLMN active in the area or region, a list of the offset frequencies relative to the short range link reference frequency (e.g., the offset frequencies identifying frequencies associated with one or more access nodes, base stations, etc.), and other time and/or code information (e.g., associated with one or more access nodes, base stations, etc.). The communication device 602 may listen for requests for wireless network information from other nearby devices via its secondary communication interface 608. If such request is received, the communication device 602 may provide the wireless network information stored in the storage device 610 via its secondary communication interface 608, thereby assisting the requesting communication device in acquiring a network communication link more quickly.

Figure 7:
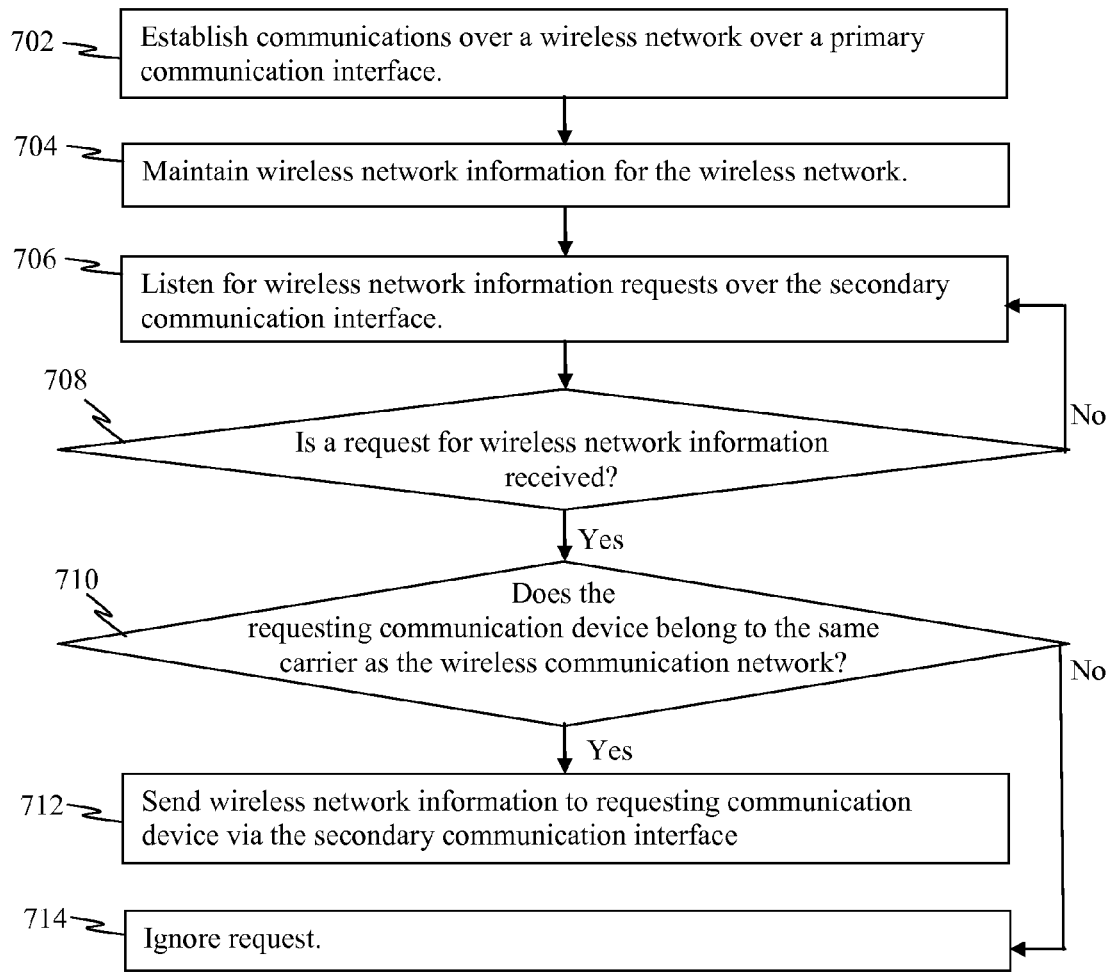
FIG. 7 illustrates a method operational on a communication device to assist initial network acquisition by another communication device.

FIG. 7 illustrates a method operational on a communication device to assist initial network acquisition by another communication device. The communication device may have established communications over a wireless network via a primary communication interface 702. Consequently, the communication device may maintain wireless network information 704 for the wireless network. The communication device may listen for wireless network information requests over the secondary communication interface. If no request is received 708, the communication device continues to listen. Otherwise, if such request is received, the communication device may optionally determine whether the requesting communication device belongs to the same carrier as the wireless communication network 710. If the requesting communication device belongs to a different carrier than the wireless communication network, it may ignore the request 714. Otherwise, the communication device may send the wireless network information to the requesting communication device via the secondary communication interface 712.

According to yet another configuration, a circuit in an access terminal may be adapted to maintain a wireless network information for a wireless network associated with a primary communication interface (e.g., wide area network interface, PLMN interface, high-power interface, long-range interface, etc.). The same circuit, a different circuit, or a second section of the same or different circuit may be adapted to receiving a wireless network information requests over a secondary communication interface (e.g., a Bluetooth-compliant interface, a peer-to-peer interface, a short-range interface, a low-power interface, etc.). In addition, the same circuit, a different circuit, or a third section of the same or different circuit may be adapted to send the wireless network information to a requesting communication device via the secondary communication interface. Similarly, the same circuit, a different circuit, or a fourth section may be adapted to monitoring a frequency band associated with the wireless network via the primary communication interface to obtain the wireless network information. The same circuit, a different circuit, or a fifth section may be adapted to ignore the request for wireless network information if it comes from a device associated with a different network carrier than the wireless network. One of ordinary skill in the art will recognize that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

The assisted network acquisition method and system described herein may be implemented for acquisition of a Universal Mobile Telecommunications System (UMTS), ultra wideband communication systems, Long Term Evolution (LTE), and WiMax networks, and other wireless networks where initial network acquisition may be cumbersome, time consuming, or otherwise problematic for devices operating in an unknown network region.

One or more of the components, steps, and/or functions illustrated in FIGS. 1, 2, 3, 4, 5, 6, and/or 7 may be rearranged and/or combined into a single component, step, or function or embodied in several components, steps, or functions. Additional elements, components, steps, and/or functions may also be added. The apparatus, devices, and/or components illustrated in FIGS. 1, 2, 4 and/or 6 may be configured or adapted to perform one or more of the methods, features, or steps described in FIGS. 3, 5 and/or 7. The algorithms described herein may be efficiently implemented in software and/or embedded hardware.

Those of skill in the art would further appreciate that the various illustrative logical blocks, modules, circuits, and algorithm steps described in connection with the configurations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems. For example, the secondary microphone cover detector may be implemented in a single circuit or module, on separate circuits or modules, executed by one or more processors, executed by computer-readable instructions incorporated in a machine-readable or computer-readable medium, and/or embodied in a handheld device, mobile computer, and/or mobile phone.

It should be noted that the foregoing configurations are merely examples and are not to be construed as limiting the claims. The description of the configurations is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on an access terminal for initial network acquisition, comprising:
sending a request for wireless communication network acquisition information to a different access terminal over a secondary communication interface;
receiving the wireless communication network acquisition information from the different access terminal over the secondary communication interface; and
acquiring a communication service from a wireless communication network over a primary communication interface, the communication service being acquired using the wireless network acquisition information received from the different access terminal over the secondary communication interface,
wherein the communication network acquisition information comprises information related to an access node of the wireless communication network.

2. The method of claim 1 wherein the primary communication interface and the secondary communication interface are adapted to communicate with different types of networks.

3. The method of claim 1 wherein the primary communication interface is adapted to communicate within a first frequency band and the secondary communication interface is adapted to communicate within a second frequency band, wherein the first and second frequency bands are non-overlapping.

4. The method of claim 1 wherein the primary communication interface is adapted for communications over a wide area wireless network via an access node.

5. The method of claim 1 wherein the primary communication interface is adapted for communications over a Public Land Mobile Network.

6. The method of claim 1 wherein the secondary communication interface is adapted for communications over at least one of an ad-hoc communication link and a peer-to-peer communication link.

7. The method of claim 1 wherein the secondary communication interface is a Bluetooth-compliant communication interface.

8. The method of claim 1 wherein the request for wireless network information is broadcasted to other local communication devices.

9. The method of claim 1 wherein the access terminal is switching operation from a first network type to a second network type.

10. A method operational on an access terminal for initial network acquisition, comprising:
sending a request for wireless network information to a different access terminal over a secondary communication interface;
receiving the wireless network information from the different access terminal over the secondary communication interface; and
acquiring a communication service from a wireless network over a primary communication interface, the communication service being acquired using the wireless network information received from the different access terminal over the secondary communication interface,
wherein the access terminal is starting or resuming operations in an unknown wireless network region.

11. A method operational on an access terminal for initial network acquisition, comprising:
sending a request for wireless network information over a secondary communication interface;
receiving the wireless network information over the secondary communication interface;
acquiring a communication service from a wireless network over a primary communication interface using the wireless network information, and
searching for a last known wireless network over the primary communication interface before sending the request for wireless network information.

12. A method operational on an access terminal for initial network acquisition, comprising:
sending a request for wireless network information over a secondary communication interface;
receiving the wireless network information over the secondary communication interface; and
acquiring a communication service from a wireless network over a primary communication interface using the wireless network information, and
scanning one or more frequency bands over the primary communication interface to obtain the wireless network information if such wireless network information is not received over the secondary communication interface.

13. A method operational on an access terminal for initial network acquisition, comprising:
sending a request for wireless network information to a different access terminal over a secondary communication interface;
receiving the wireless network information from the different access terminal over the secondary communication interface; and
acquiring a communication service from a wireless network over a primary communication interface, the communication service being acquired using the wireless network information received from the different access terminal over the secondary communication interface,
wherein the request for wireless network information is either one of a specific request for a particular type of network or a general request for all available networks.

14. A method operational on an access terminal for initial network acquisition, comprising:
sending a request for wireless network information over a secondary communication interface;
receiving the wireless network information over the secondary communication interface;
acquiring a communication service from a wireless network over a primary communication interface using the wireless network information;
ascertaining a network type associated with the received wireless network information; and
selecting a mode of operation for the primary communication interface consistent with the network type.

15. An access terminal comprising:
a primary communication interface adapted for communications over a wide area wireless network;
a secondary communication interface adapted for communications over an ad-hoc communication link;
a processing circuit coupled to the primary communication interface and the secondary communication interface, the processing circuit configured to
send a request for wireless communication network acquisition information to a different access terminal over the secondary communication interface;

receive the wireless communication network acquisition information from the different access terminal over the secondary communication interface; and acquire a communication service from a wireless communication network over the primary communication interface, the communication service being acquired using the wireless network information received from the different access terminal over the secondary communication interface, wherein the communication network acquisition information comprises information related to an access node of the wireless communication network.

16. The access terminal of claim 15 wherein the primary communication interface and the secondary communication interface are adapted to communicate with different types of networks.

17. The access terminal of claim 15 wherein the primary communication interface is adapted to communicate within a first frequency band and the secondary communication interface is adapted to communicate within a second frequency band, wherein the first and second frequency band are non-overlapping.

18. The access terminal of claim 15 wherein the primary communication interface is adapted for communications over a wide area wireless network.

19. The access terminal of claim 15 wherein the primary communication interface is adapted for communications over a Public Land Mobile Network.

20. The access terminal of claim 15 wherein the secondary communication interface is adapted for communications over at least one of an ad-hoc communication link and a peer-to-peer communication link.

21. The access terminal of claim 15 wherein the secondary communication interface is a Bluetooth-compliant communication interface.

22. The access terminal of claim 15 wherein the primary communication interface is adapted for long-range communications relative to the secondary communication interface which is adapted for short-range communications.

23. The access terminal of claim 15 wherein the request for wireless network information is broadcasted to other local communication devices.

24. The access terminal of claim 15 wherein the access terminal is switching operation from a first network type to a second network type.

25. An access terminal comprising:
a primary communication interface adapted for communications over a wide area wireless network;
a secondary communication interface adapted for communications over an ad-hoc communication link;
a processing circuit coupled to the primary communication interface and the secondary communication interface, the processing circuit configured to
send a request for wireless network information to a different access terminal over the secondary communication interface;
receive the wireless network information from the different access terminal over the secondary communication interface; and
acquire a communication service from a wireless network over the primary communication interface, the communication service being acquired using the wireless network information received from the different access terminal over the secondary communication interface,
wherein the access terminal is starting or resuming operations in an unknown wireless network region.

26. An access terminal comprising:
a primary communication interface adapted for communications over a wide area wireless network;
a secondary communication interface adapted for communications over an ad-hoc communication link;
a processing circuit coupled to the primary communication interface and the secondary communication interface, the processing circuit configured to
send a request for wireless network information over the secondary communication interface;
receive the wireless network information over the secondary communication interface; and
acquire a communication service from a wireless network over the primary communication interface using the wireless network information,
wherein the processing circuit is further configured to search for last known wireless network over the primary communication interface before sending the request for wireless network information.

27. An access terminal comprising:
a primary communication interface adapted for communications over a wide area wireless network;
a secondary communication interface adapted for communications over an ad-hoc communication link;
a processing circuit coupled to the primary communication interface and the secondary communication interface, the processing circuit configured to
send a request for wireless network information over the secondary communication interface;
receive the wireless network information over the secondary communication interface; and
acquire a communication service from a wireless network over the primary communication interface using the wireless network information,
wherein the processing circuit is further configured to scan a frequency band over the primary communication interface to obtain the wireless network information if such wireless network information is not received over the secondary communication interface.

28. An access terminal comprising:
a primary communication interface adapted for communications over a wide area wireless network;
a secondary communication interface adapted for communications over an ad-hoc communication link;
a processing circuit coupled to the primary communication interface and the secondary communication interface, the processing circuit configured to
send a request for wireless network information to a different access terminal over the secondary communication interface;
receive the wireless network information from the different access terminal over the secondary communication interface; and
acquire a communication service from a wireless network over the primary communication interface, the communication service being acquired using the wireless network information received from the different access terminal over the secondary communication interface, wherein the request for wireless network information is either one of a specific request for a particular type of network or a general request for all available networks.

29. An access terminal comprising:
means for sending a request for wireless communication network acquisition information to a different access terminal over a secondary communication interface;

means for receiving the wireless communication network acquisition information from the different access terminal over the secondary communication interface; and means for acquiring a communication service from a wireless communication network over a primary communication interface, the communication service being acquired using the wireless network information received from the different access terminal over the secondary communication interface, wherein the communication network acquisition information comprises information related to an access node of the wireless communication network.

30. The access terminal of claim 29 wherein the primary communication interface and the secondary communication interface are adapted to communicate with different types of networks.

31. An access terminal comprising:

means for sending a request for wireless network information over a secondary communication interface;

means for receiving the wireless network information over the secondary communication interface;

means for acquiring a communication service from a wireless network over a primary communication interface using the wireless network information; and means for searching for last known wireless network over the primary communication interface before sending the request for wireless network information.

32. An access terminal comprising:

means for sending a request for wireless network information over a secondary communication interface;

means for receiving the wireless network information over the secondary communication interface;

means for acquiring a communication service from a wireless network over a primary communication interface using the wireless network information; and means for scanning one or more frequency band over the primary communication interface to obtain the wireless network information if such wireless network information is not received over the secondary communication interface.

33. A circuit for wireless network communications, wherein the circuit is adapted to send a request for wireless communication network acquisition information to a different access terminal over a secondary communication interface;

receive the wireless communication network acquisition information from the different access terminal over the secondary communication interface; and acquire a communication service from a wireless communication network over a primary communication interface, the communication service being acquired using the wireless network information received from the different access terminal over the secondary communication interface, wherein the communication network acquisition information comprises information related to an access node of the wireless communication network.

34. The circuit of claim 33 wherein the primary communication interface and the secondary communication interface are adapted to communicate with different types of networks.

35. A circuit for wireless network communications, wherein the circuit is adapted to send a request for wireless network information over a secondary communication interface;

receive the wireless network information over the secondary communication interface; and acquire a communication service from a wireless network over a primary communication interface using the wireless network information, wherein the circuit is adapted to scan one or more frequency bands over the primary communication interface to obtain the wireless network information if such wireless network information is not received over the secondary communication interface.

36. A non-transitory computer-readable medium comprising instructions for initial network acquisition, which when executed by a processor causes the processor to send a request for wireless communication network acquisition information to a different access terminal over a secondary communication interface;

receive the wireless communication network acquisition information from the different access terminal over the secondary communication interface; and acquire a communication service from a wireless communication network over a primary communication interface, the communication service being acquired using the wireless network information received from the different access terminal over the secondary communication interface, wherein the communication network acquisition information comprises information related to an access node of the wireless communication network.

37. A non-transitory computer-readable medium comprising instructions for initial network acquisition, which when executed by a processor causes the processor to send a request for wireless network information over a secondary communication interface;

receive the wireless network information over the secondary communication interface; and acquire a communication service from a wireless network over a primary communication interface using the wireless network information, further comprising instructions which when executed by a processor causes the processor to scan one or more frequency bands over the primary communication interface to obtain the wireless network information if such wireless network information is not received over the secondary communication interface.

38. A method operational on an access terminal for assisting another device in initial network acquisition, comprising:

maintaining wireless communication network acquisition information for a wireless network associated with a primary communication interface, wherein the wireless communication network acquisition information includes one or more of a communication frequency and a scrambling code of the wireless network;

receiving a wireless communication network acquisition information request over a secondary communication interface from a different access terminal; and sending the wireless communication network acquisition information to the different access terminal via the secondary communication interface, wherein the wireless communication network acquisition information is used by the different access terminal to acquire a communication service from the wireless network over a primary communication interface of the different access terminal.

39. The method of claim 38 wherein the primary communication interface and the secondary communication interface are adapted to communicate with different types of networks.

40. The method of claim 38 wherein the primary communication interface is adapted for communications over a wide area wireless network.

41. The method of claim 38 wherein the primary communication interface is adapted for communications over a Public Land Mobile Network.

42. The method of claim 38 wherein the secondary communication interface is adapted for communications over at least one of an ad-hoc communication link and a peer-to-peer communication link.

43. The method of claim 38 wherein the secondary communication interface is a Bluetooth-compliant communication interface.

44. A method operational on an access terminal for assisting another device in initial network acquisition, comprising:
maintaining a wireless network information for a wireless network associated with a primary communication interface;
receiving a wireless network information request over a secondary communication interface from a requesting communication device; and
sending the wireless network information to the requesting communication device via the secondary communication interface; and
monitoring a frequency band associated with the wireless network via the primary communication interface to obtain the wireless network information.

45. A method operational on an access terminal for assisting another device in initial network acquisition, comprising:
maintaining a wireless network information for a wireless network associated with a primary communication interface;
receiving a wireless network information request over a secondary communication interface from a requesting communication device; and
sending the wireless network information to the requesting communication device via the secondary communication interface; and
ignoring the request for wireless network information if it comes from a device associated with a different network carrier than the wireless network.

46. A method operational on an access terminal for assisting another device in initial network acquisition, comprising:
maintaining a wireless network information for a wireless network associated with a primary communication interface, wherein the wireless communication network acquisition information includes one or more of a communication frequency and a scrambling code of the wireless network;
receiving a wireless network information request over a secondary communication interface from a requesting communication device; and
sending the wireless network information to the requesting communication device via the secondary communication interface,
wherein the wireless communication network information is used by the requesting communication device to acquire a communication service from the wireless network over a primary communication interface of the requesting communication device, and
wherein the received request for wireless network information is one either of a specific request for a particular type of network or a general request for all available networks.

47. An access terminal comprising:
a primary communication interface adapted for communications over a wide area wireless network;
a secondary communication interface adapted for communications over an ad-hoc communication link;
a processing circuit coupled to the primary communication interface and the secondary communication interface, the processing circuit configured to
maintain a wireless communication network acquisition information for a wireless communication network associated with the primary communication interface, wherein the wireless communication network acquisition information includes one or more of a communication frequency and a scrambling code of the wireless network;
receive a wireless communication network acquisition information request over the secondary communication interface from a different access terminal; and
send the wireless communication network acquisition information to the different access terminal via the secondary communication interface, wherein the wireless communication network acquisition information is used by the different access terminal to acquire a communication service from the wireless network over a primary communication interface of the different access terminal.

48. The access terminal of claim 47 wherein the primary communication interface and the secondary communication interface are adapted to communicate with different types of networks.

49. The access terminal of claim 47 wherein the primary communication interface is adapted for communications over a wide area wireless network.

50. The access terminal of claim 47 wherein the primary communication interface is adapted for communications over a Public Land Mobile Network.

51. The access terminal of claim 47 wherein the secondary communication interface is adapted for communications over at least one of an ad-hoc communication link and a peer-to-peer communication link.

52. The access terminal of claim 47 wherein the secondary communication interface is a Bluetooth-compliant communication interface.

53. A method operational on an access terminal for assisting another device in initial network acquisition, comprising:
maintaining a wireless network information for a wireless network associated with a primary communication interface;
receiving a wireless network information request over a secondary communication interface from a requesting communication device; and
sending the wireless network information to the requesting communication device via the secondary communication interface; and
wherein the processing circuit is further configured to
monitor a frequency band associated with the wireless network via the primary communication interface to obtain the wireless network information.

54. A method operational on an access terminal for assisting another device in initial network acquisition, comprising:
maintaining a wireless network information for a wireless network associated with a primary communication interface;
receiving a wireless network information request over a secondary communication interface from a requesting communication device; and
sending the wireless network information to the requesting communication device via the secondary communication interface; and
wherein the processing circuit is further configured to ignore the request for wireless network information if it comes from a device associated with a different network carrier than the wireless network.

55. A method operational on an access terminal for assisting another device in initial network acquisition, comprising:
maintaining a wireless network information for a wireless network associated with a primary communication interface, wherein the wireless communication network acquisition information includes one or more of a communication frequency and a scrambling code of the wireless network;
receiving a wireless network information request over a secondary communication interface from a requesting communication device; and
sending the wireless network information to the requesting communication device via the secondary communication interface; and
wherein the received request for wireless network information is one either of a specific request for a particular type of network or a general request for all available networks.

56. An access terminal comprising:
means for maintaining a wireless communication network acquisition information for a wireless communication network associated with a primary communication interface, wherein the wireless communication network acquisition information includes one or more of a communication frequency and a scrambling code of the wireless network;
means for receiving a wireless communication network acquisition information request over a secondary communication interface from a different access terminal; and
means for sending wireless communication network acquisition information to the different access terminal via the secondary communication interface, wherein the wireless communication network acquisition information is used by the different access terminal to acquire a communication service from the wireless communication network over a primary communication interface of the different access terminal.

57. The access terminal of claim 56 wherein the primary communication interface is adapted to communicate within a first frequency band and the secondary communication interface is adapted to communicate within a second frequency band, wherein the first and second frequency band are non-overlapping.

58. An access terminal comprising:
means for maintaining a wireless network information for a wireless network associated with a primary communication interface;
means for receiving a wireless network information request over a secondary communication interface from a requesting communication device; and
means for sending wireless network information to the requesting communication device via the secondary communication interface and
means for monitoring a frequency band associated with the wireless network via the primary communication interface to obtain the wireless network information.

59. A circuit for wireless network communications, wherein the circuit is adapted to
maintain a wireless communication network acquisition information for a wireless communication network associated with a primary communication interface, wherein the wireless communication network acquisition information includes one or more of a communication frequency and a scrambling code of the wireless network;
receive a wireless communication network acquisition information request over a secondary communication interface from a different access terminal; and
send wireless communication network acquisition information to the different access terminal via the secondary communication interface, wherein the wireless communication network acquisition information is used by the different access terminal to acquire a communication service from the wireless communication network over a primary communication interface of the different access terminal.

60. A circuit for wireless network communications, wherein the circuit is adapted to
maintain a wireless network information for a wireless network associated with a primary communication interface;
receive a wireless network information request over a secondary communication interface from a requesting communication device;
send wireless network information to the requesting communication device via the secondary communication interface; and
monitor a frequency band associated with the wireless network via the primary communication interface to obtain the wireless network information.

61. A non-transitory computer-readable medium comprising instructions for initial network acquisition, which when executed by a processor causes the processor to
maintain a wireless communication network acquisition information for a wireless communication network associated with a primary communication interface, wherein the wireless communication network acquisition information includes one or more of a communication frequency and a scrambling code of the wireless network;
receive a wireless communication network acquisition information request over a secondary communication interface from a different access terminal; and
send wireless communication network acquisition information to the different access terminal via the secondary communication interface, wherein the wireless communication network acquisition information is used by the different access terminal to acquire a communication service from the wireless communication network over a primary communication interface of the different access terminal.

62. A non-transitory computer-readable medium comprising instructions for initial network acquisition, which when executed by a processor causes the processor to
maintain a wireless network information for a wireless network associated with a primary communication interface;
receive a wireless network information request over a secondary communication interface from a requesting communication device;
send wireless network information to the requesting communication device via the secondary communication interface, and
monitor a frequency band associated with the wireless network via the primary communication interface to obtain the wireless network information.

* * * * *